(12) United States Patent
Ho et al.

(10) Patent No.: US 8,933,792 B2
(45) Date of Patent: Jan. 13, 2015

(54) MOVING CARRIER SIGNAL TRANSMISSION METHOD AND DEVICE THEREOF

(71) Applicant: Industrial Technology Research Institute, Hsinchu (TW)

(72) Inventors: Ping-Fan Ho, Taipei (TW); Ming-Fong Tsai, New Taipei (TW); Ming-Hsuan Cheng, Hsinchu (TW); Jyh-Cheng Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 158 days.

(21) Appl. No.: 13/762,977

(22) Filed: Feb. 8, 2013

(65) Prior Publication Data

US 2014/0091911 A1    Apr. 3, 2014

(30) Foreign Application Priority Data

Oct. 1, 2012  (TW) .............................. 101136277 A

(51) Int. Cl.
*H04Q 5/22*  (2006.01)
*G06K 7/01*  (2006.01)

(52) U.S. Cl.
CPC ....................................... *G06K 7/01* (2013.01)
USPC ........ 340/10.42; 340/435; 340/436; 340/902; 340/903; 180/168; 701/117; 701/301

(58) Field of Classification Search
CPC ....................................................... G06K 7/01
USPC .......... 340/10.4, 10.42, 425.5, 435, 436, 438, 340/901, 902, 903; 180/167, 168; 701/117, 701/301

See application file for complete search history.

(56) References Cited

U.S. PATENT DOCUMENTS 5,781,119 A * 7/1998 Yamashita et al. ............ 340/903
6,405,132 B1   6/2002 Breed et al.
(Continued)

FOREIGN PATENT DOCUMENTS

| TW | 301102 B | 3/1997 |
|---|---|---|
| TW | I287514 B | 10/2007 |
| TW | I311961 B | 7/2009 |
| TW | I356011 | 1/2012 |

OTHER PUBLICATIONS

Knoeppel et al., Robust Vehicle Detection at Large Distance Using Low Resolution Cameras, Proceedings of the IEEE Intelligent Vehicles Symposium, 2000, IV, 2000, pp. 267-272.
(Continued)

*Primary Examiner* — Anh V La
(74) *Attorney, Agent, or Firm* — Morris Manning & Martin LLP; Tim Tingkang Xia, Esq.

(57) ABSTRACT

A moving carrier signal transmission method and a signal transmission device using the same are provided. A main moving carrier acquires an identification code of an ambient moving carrier. The main moving carrier adds an identification code of the main moving carrier and the identification code of the ambient moving carrier in a data request and then sends out the data request to the ambient moving carrier according to the identification code of the ambient moving carrier. When the ambient moving carrier obtains the data request, the ambient moving carrier adds the identification code of the main moving carrier in a moving carrier list and transmits the moving carrier list to the main moving carrier.

15 Claims, 14 Drawing Sheets

(56) References Cited

U.S. PATENT DOCUMENTS

| | | | |
|---|---|---|---|
| 7,804,423 B2 | 9/2010 | Mudalige et al. | |
| 8,289,186 B2* | 10/2012 | Osafune | 340/903 |
| 8,352,112 B2* | 1/2013 | Mudalige | 701/24 |
| 8,599,038 B2* | 12/2013 | Yamashiro | 340/903 |
| 2002/0198660 A1* | 12/2002 | Lutter et al. | 701/301 |
| 2009/0258642 A1 | 10/2009 | Golenski | |

OTHER PUBLICATIONS

Agrawal et al., Real-time localization in outdoor environments using stereo vision and inexpensive GPS, The 18th International Conference on Pattern Recognition, (ICPR 2006), 2006, pp. 1063-1068.

Sun et al., On-road vehicle detection a review, Pattern Analysis and Machine Intelligence, IEEE Transactions on Pattern Analysis and Machine Inteligence, 2006, vol. 28(5), pp. 694-711.

Pink et al., Visual map matching and localization using a global feature map, IEEE Computer Society Conference on Computer Vision and Pattern Recognition Workshops, 2008 (CVPRW '08). 2008, pp. 1-7.

Dong, Wei-Yi, A Lane Departure and Forward Collision Warning System for Smartphones, Master Thesis, Department of Electrical Engineering, College of Electrical Engineering and Computer Science, National Taiwan University, 2011.

Intellectual Property Office, Ministry of Economic Affairs, R.O.C., "Office Action", Oct. 2, 2014, Taiwan.

* cited by examiner

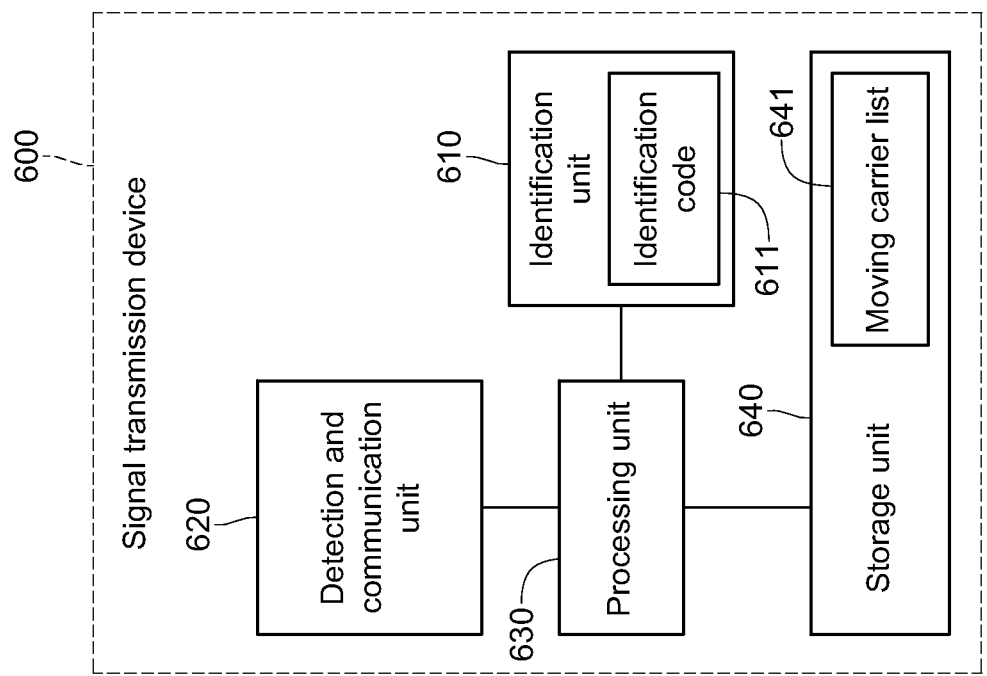

MOVING CARRIER SIGNAL TRANSMISSION METHOD AND DEVICE THEREOF

CROSS-REFERENCE STATEMENT

This non-provisional application claims priority under 35 U.S.C. §119(a) on Patent Application No(s). 101136277 filed in Taiwan, R.O.C. on Oct. 1, 2012, the entire contents of which are hereby incorporated by reference.

TECHNICAL FIELD

The disclosure relates to a moving carrier signal transmission method and an electronic device, and more particularly to a moving carrier signal transmission method and a device thereof.

BACKGROUND

With the popularization of moving carriers, people are available to go to any desire place. To let people arrive their destinations safely, more and more companies attend to the driving safety and the traffic safety. Accordingly, some companies provide moving carrier sensing systems having the global positioning system (GPS).

In the previous moving carrier sensing method, every moving carrier knows the distribution condition of moving carriers on the road through the GPS. Subsequently, the distribution condition of moving carriers on the road is sent from one moving carrier to other moving carriers. Thus, every moving carrier on the road may know the positions and speeds of ambient moving carriers thereof.

However, the GPS has the positioning error in usage. Generally, the positioning error is between 8 meter and 15 meter. Moreover, the GPS may be affected by a block, for example, a building or a corniche, so that moving carriers may not position accurately in the section where the building or the corniche is. The distribution condition of other moving carriers, which is received by the moving carrier in the section, does not fit the real situation. Thus, a driver of the moving carrier in the section would determine the positions of ambient moving carriers wrongly.

A real time moving carrier crashworthy warning system and a method thereof in Taiwan Patent No. 1356011 utilize the GPS positioning method to determine the positions of ambient moving carriers. Subsequently, the real time moving carrier crashworthy warning system sends its position information to other moving carriers through a broadcast manner. However, errors may occur in the GPS. Thus, the GPS positioning method may not determine the correct relation between two moving carriers and then cause the competition and collision of packages.

Otherwise, a real time traffic aide disclosed in U.S. Pat. No. 7,804,423 also provides a real time moving carrier crashworthy system and a method thereof. The real time traffic aide utilizes an image identification manner to determine ambient moving carriers, so as to obtain the position information of ambient moving carriers. Moreover, the real time traffic aide also utilizes a wireless transmission manner to transmit the position information of every ambient moving carrier to other moving carriers. However, the relative distance between two moving carriers may be changed suddenly when an emergency event occurs. This causes that other moving carriers can not have a real-time response, thereby endangering back moving carriers.

SUMMARY

The disclosure relates to a moving carrier signal transmission method. An identification code of an ambient moving carrier ambient is acquired by a main moving carrier through detecting the ambient moving carrier. The identification (ID) code of the main moving carrier is added in a data request by the main moving carrier, and then the data request is outputted to the ambient moving carrier according to the identification code of the ambient moving carrier. When the ambient moving carrier obtains the data request, the identification code of the main moving carrier is added in a moving carrier list by the ambient moving carrier, and the moving carrier list is transmitted to the main moving carrier by the ambient moving carrier. According to the position of the ambient moving carrier and of the main moving carrier, the identification codes in the moving carrier list are sorted.

The disclosure relates to a moving carrier signal transmission device. The moving carrier signal transmission device comprises an identification unit, a detection unit, a communication unit, a storage unit and a processing unit. The identification unit stores identification codes. The detection unit detects whether any ambient moving carrier is in the detectable threshold distance of a main moving carrier. The communication unit transmits a data request or a moving carrier list. The storage unit stores the moving carrier list. The processing unit electronically connects to the identification unit, the communication unit and the storage unit. When an ambient moving carrier is in the detectable threshold distance, the processing unit actuates the communication unit to acquire an identification code of the ambient moving carrier from the ambient moving carrier. The processing unit adds the identification code of the main moving carrier in a data request and then actuates the communication unit to transmit the data request to the ambient moving carrier according to the identification code of the ambient moving carrier. The ambient moving carrier adds the identification code of the main moving carrier in a moving carrier list and transmits the moving carrier list to the main moving carrier.

The disclosure relates to a moving carrier signal transmission device. The moving carrier signal transmission device comprises an identification unit, a detection and communication unit, a storage unit and a processing unit. The identification unit stores identification codes. The detection and communication unit determines whether any ambient moving carrier is in a detectable threshold distance of the main moving carrier. The detection and communication unit transmits a data request or a moving carrier list to an ambient moving carrier. The storage unit stores the moving carrier list. The processing unit electronically connects to the identification unit, the detection and communication unit and the storage unit. When the ambient moving carrier is in the detectable threshold distance, the processing unit actuates the detection and communication unit to acquire an identification code of the ambient moving carrier from the ambient moving carrier. Subsequently, the processing unit adds the identification code of the main moving carrier into the data request and actuates the detection and communication unit to transmit the data request to the ambient moving carrier according to the identification code of the ambient moving carrier. Finally, the ambient moving carrier adds the identification code of the main moving carrier in the moving carrier list and transmits the moving carrier list to the main moving carrier.

For purposes of summarizing, some aspects, advantages and features of some embodiments of the disclosure have been described in this summary. Not necessarily all of (or any of) these summarized aspects, advantages or features will be embodied in any particular embodiment of the disclosure. Some of these summarized aspects, advantages and features and other aspects, advantages and features may become more fully apparent from the following detailed description and the appended claims.

BRIEF DESCRIPTION OF THE DRAWINGS

The present disclosure will become more fully understood from the detailed description given herein below for illustration only, and thus are not limitative of the present disclosure, and wherein:

FIG. 6 is a structural diagram of the moving carrier signal transmission device according to an embodiment of the disclosure.

DETAILED DESCRIPTION

The detailed features and advantages of the disclosure are described below in great detail through the following embodiments, the content of which is sufficient for those of ordinary skill in the art to understand the technical content of the disclosure and to implement the disclosure accordingly. Based upon the content of the specification, the claims, and the drawings, those of ordinary skill in the art can easily understand the relevant objectives and advantages of the disclosure.

The moving carrier signal transmission device may be capable of moving independently or be disposed on any movable object which is capable of moving along a constant track. The movable object may be any movable equipment, or a vehicle, such as a car and a motorcycle, or a pedestrian. The constant track may be a lane, a sidewalk or any path which allows the movable object to move along, so that the movable objects have a relative position relation with each other. Thus, moving carriers, equipments, or pedestrians, are capable of communicating with each other via the moving carrier signal transmission device of the disclosure.

Figure 1A:
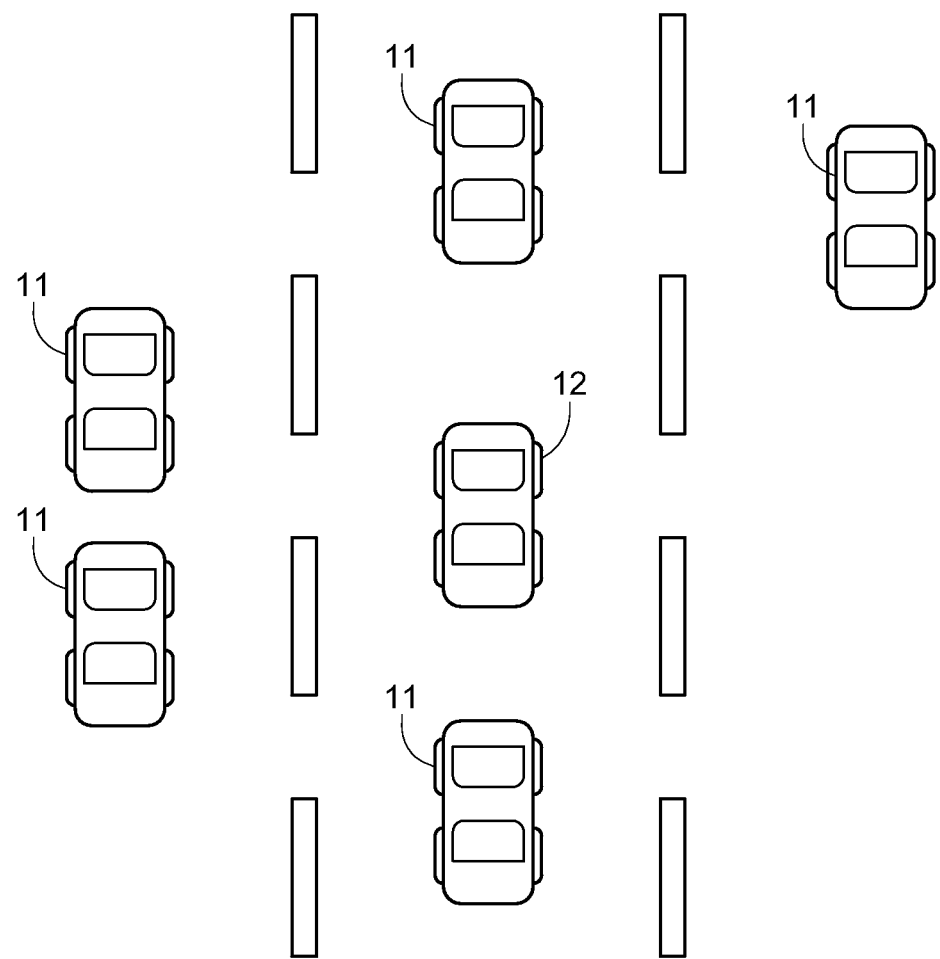
FIG. 1A is a schematic diagram of various states among moving carriers of the disclosure.

FIG. 1A illustrates a schematic diagram of various states among moving carriers of the disclosure. There are many moving carriers. To clearly present moving carriers which respectively have a specific function, the disclosure respectively labels the moving carriers by a corresponding name. To clearly describe how to establish a moving carrier list 151, it is taken as an example to select two seriate ones of the moving carriers. To clearly describe the relation between the selected two moving carriers, one of the selected two moving carriers is labeled a main moving carrier 12, and another one of the selected two moving carriers is labeled an ambient moving carrier 11. The main moving carrier 12 is the one which outputs a detection request. The ambient moving carrier 11 is the one which is detected and is at any detectable position which is in the right side of, in the left side of, in front of or in back of the main moving carrier 12. According to the following transmission manner between the ambient moving carrier 11 and the main moving carrier 12, other moving carriers also communicate with each other.

Figure 1B:
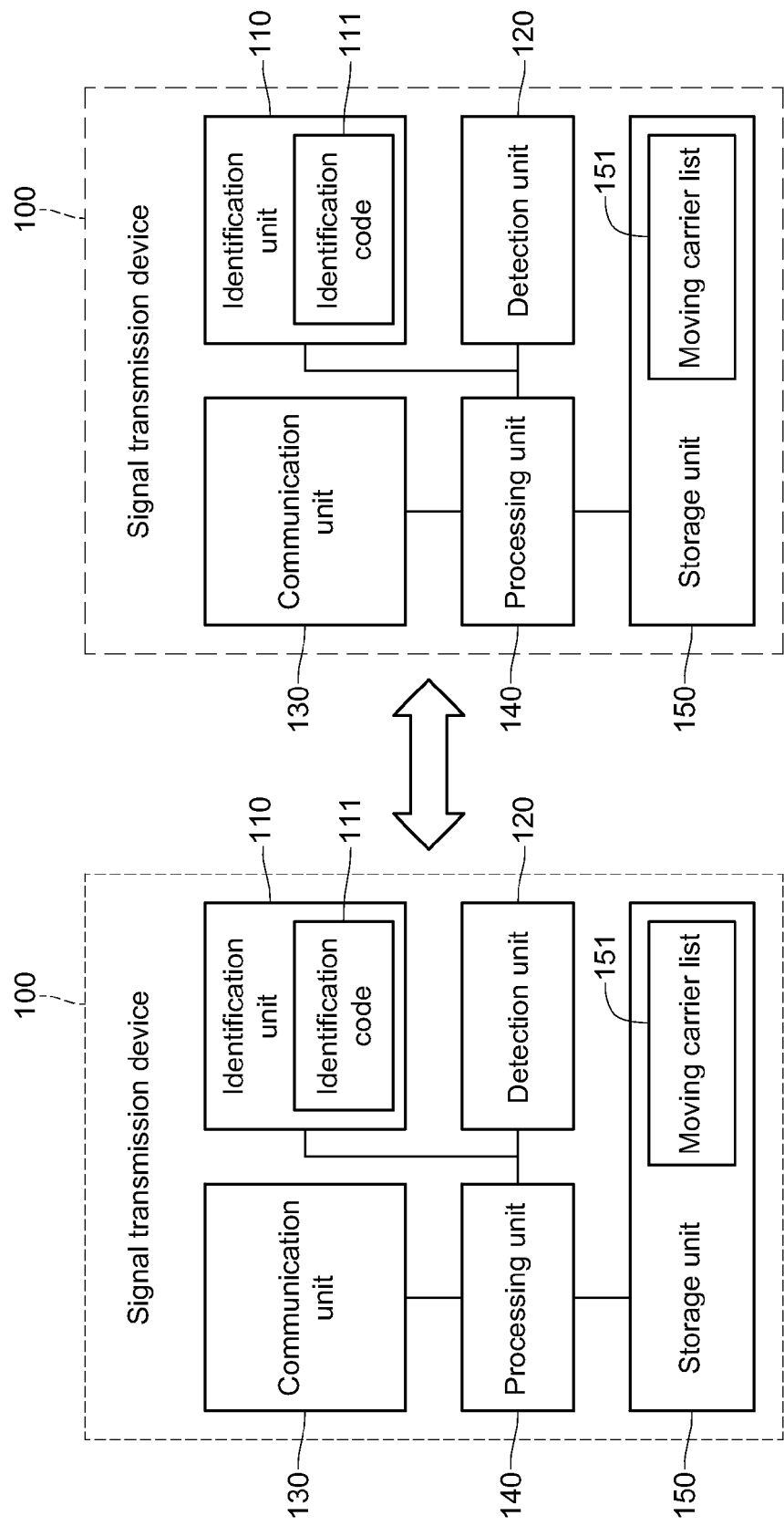
FIG. 1B is a structural diagram of the moving carrier signal transmission device according to an embodiment of the disclosure.

In one state of FIG. 1A, the main moving carrier 12 is in back of the ambient moving carrier 11. To clearly describe the moving carrier signal transmission device 100, one moving carrier signal transmission device 100 is taken as an example. FIG. 1B illustrates a structural diagram of the moving carrier signal transmission device according to an embodiment of the disclosure. The moving carrier signal transmission device 100 at least includes an identification unit 110, a detection unit 120, a communication unit 130, a processing unit 140 and a storage unit 150. The processing unit 140 electronically connects to the identification unit 110, the detection unit 120, the communication unit 130 and the storage unit 150.

The identification unit 110 stores an identification code 111 of the moving carrier signal transmission device 100. Every identification code 111 is unique, that is, the moving carrier signal transmission device 100 in a moving carrier has its own identification code 111. The identification code 111 may be any identifiable code or any identifiable characteristic, for example, a vehicle identification number, an engine registration number, an identification number of a driver, or a specific code.

The detection unit 120 detects whether any ambient moving carrier 11 is in a detectable threshold distance in front of or in back of the main moving carrier 12. The detectable threshold distance is a maximum distance between the main moving carrier 12 and an ambient moving carrier 11, in which the main moving carrier 12 is capable of detecting the ambient moving carrier 11. The detection unit 120 may acquire the identification codes 111 from other moving carriers via the radar technique, the wireless network technique, the wireless access in the vehicular environment/dedicated short range communication (WAVE/DSRC) technique, the free space optics (FSO) technique, the Bluetooth technique, the radio-frequency identification (RFID) technique, the ultra wide-band technique, the laser sensing technique, the infrared sensing technique or so on. Besides, the detection unit 120 is also capable of acquiring an identifiable characteristic, for example, a vehicle identification number or an external appearance, as a visible identification code 111 of a moving carrier or of an equipment via the image identification technique.

When the detection unit 120 discovers that one ambient moving carrier 11 in the detectable threshold distance, the processing unit 140 actuates the communication unit 130 to communicate with the ambient moving carrier 11 and acquires an identification code 111 of the ambient moving carrier 11. The transmission protocol used by the communication unit 130 can be, for example, the radar technique, the wireless network technique, the WAVE/DSRC technique, the FSO technique, the Bluetooth technique, the RFID technique, the ultra wideband technique, the laser sensing technique, the infrared sensing technique or so on. The setting of the detectable threshold distance is based on the transmission protocol used by the communication unit 130.

In the embodiment of the radar technique, the main moving carrier 12 can set the detectable threshold distance at 200 m (meter) or the farther. When the ambient moving carrier 11 is driven into the lane of the main moving carrier 12 from another lane and when the distance between the ambient moving carrier 11 and the main moving carrier 12 is smaller than the detectable threshold distance, the main moving carrier 12 acquires the identification code 111 of the ambient moving carrier 11 from the ambient moving carrier 11.

After the main moving carrier 12 obtains the identification code 111 of the ambient moving carrier 11, the processing unit 140 in the main moving carrier 12 actuates the communication unit 130 to communicate with the ambient moving carrier 11 for data transmission. Herein, the main moving carrier 12 transmits a data request to the ambient moving carrier 11 according to the identification code 111 of the ambient moving carrier 11. When the ambient moving carrier 11 obtains the data request, the ambient moving carrier 11 adds the identification code 111 of the main moving carrier 12 in a moving carrier list 151 and then transmits the moving carrier list 151 to the main moving carrier 12. The manner to establish the moving carrier list 151 is described as follows.

Figure 2A:
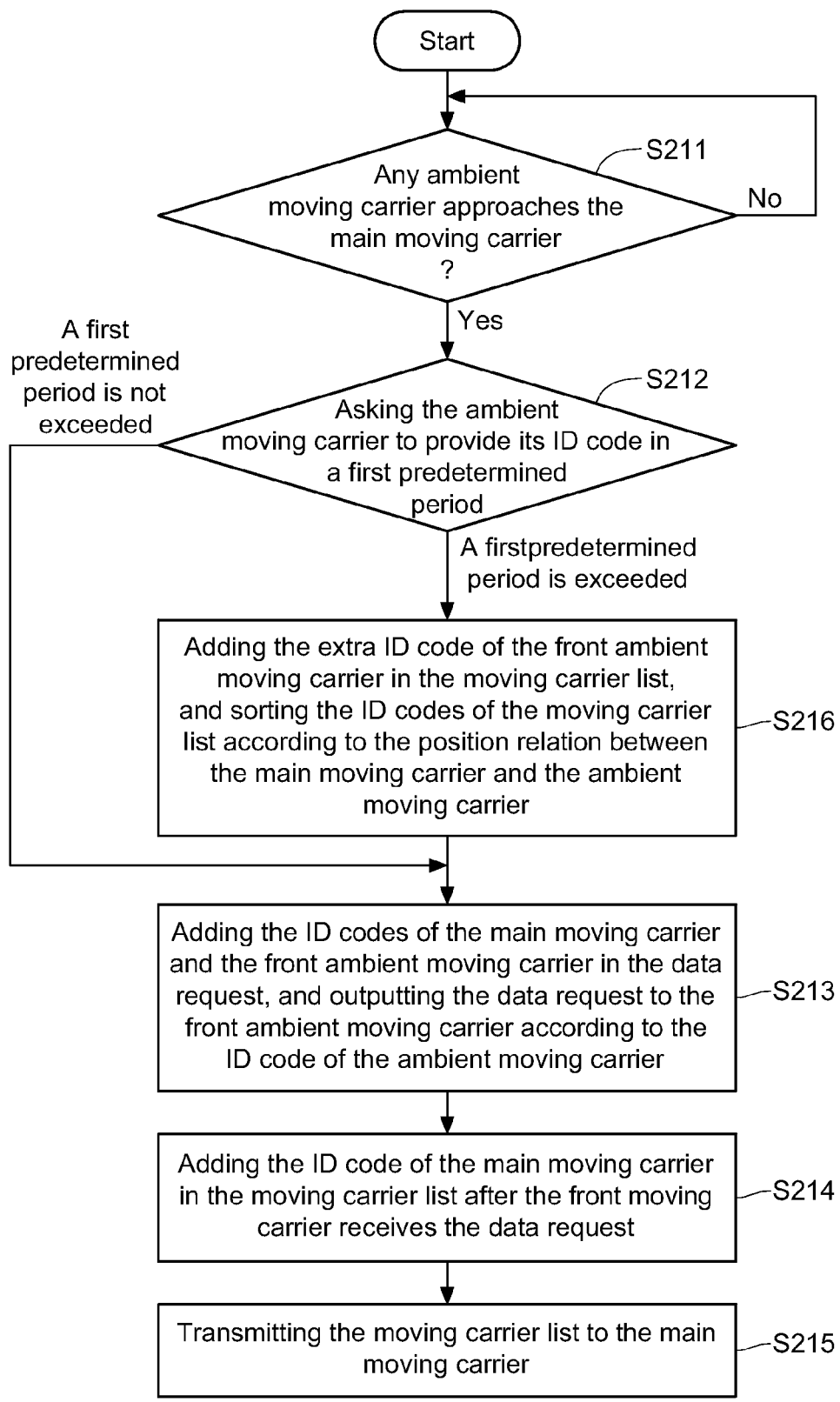
FIG. 2A is a flow chart of establishing a front moving carrier list according to the disclosure.

FIG. 2A illustrates a flow chart of establishing a front moving carrier list according to the disclosure. The main moving carrier detects whether any ambient moving carrier in front of the main moving carrier approaches the main moving carrier (the step S211). When an ambient moving carrier in front of the main moving carrier approaches the main moving carrier, the main moving carrier asks this ambient moving carrier to provide an identification code of the ambient moving carrier in a first predetermined period (the step S212). When this ambient moving carrier provides the identification code thereof in the first predetermined period, the main moving carrier adds the identification codes of the main moving carrier and the ambient moving carrier in a data request and then outputs the data request to this ambient moving carrier according to the identification code of this ambient moving carrier (the step S213).

When this ambient moving carrier obtains the data request, this ambient moving carrier adds the identification code of the main moving carrier into a moving carrier list (the step S214) and then transmits the moving carrier list to the main moving carrier (the step S215). When this ambient moving carrier does not respond in a first predetermined period, the main moving carrier adds (records) an extra identification code, which belongs to this ambient moving carrier, in the moving carrier list to sort the identification codes in the moving carrier list according to the positions of this ambient moving carrier and the main moving carrier (the step S216), and then the process returns to the step S213.

The steps S211, S212, S216 and S213 are performed by the main moving carrier, and the steps S214 and S215 are performed by the ambient moving carrier. The detailed description of establishing the moving carrier list in FIG. 2A is shown as below.

Figure 2B:
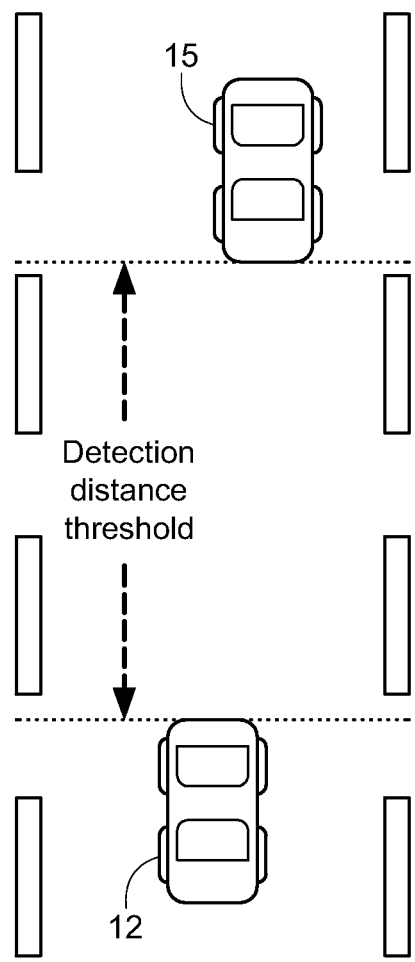
FIG. 2B is a schematic diagram of detecting a front moving carrier according to the disclosure.

Referring to FIG. 2A and FIG. 2B, there are a plurality of moving carriers in the same lane. Herein, it is taken as an example for the illustration purpose to detect the ambient moving carrier 11 in front of the main moving carrier 12 and show only two seriate moving carriers in the same lane. The ambient moving carrier 11 in front of the main moving carrier 12 is defined as a front moving carrier 15. For example, the front moving carrier 15 is the one which is driving in a lane as the same as where the main moving carrier 12 is, or the one which enters into the lane where the main moving carrier 12 is, from another lane.

When the front moving carrier 15 is in the detectable threshold distance, the main moving carrier 12 detects the front moving carrier 15 to identify the identification code 111 of the front moving carrier 15. Specifically, when the front moving carrier 15 just arrives at the position which is the detectable threshold distance away from the main moving carrier 12, the main moving carrier 12 begins detecting the front moving carrier 15.

In one state of this embodiment, if the main moving carrier 12 and the front moving carrier 15 can not communicate with each other via the foregoing wireless transmission protocol, the main moving carrier 12 can communicate with the front moving carrier 15 via the foregoing image identification technique or via the foregoing radar technique to acquire an extra identification code of the front moving carrier 15, and adds the extra identification code of the front moving carrier 15 and the identification code of the main moving carrier 12 in the data request. In another state of this embodiment, if the front moving carrier 15 can not transmit the identification code 111 thereof to the main moving carrier 12 via the foregoing wireless transmission protocol, the main moving carrier 12 adds the extra identification code in the moving carrier list 151. Hereinafter, the extra identification code of the front moving carrier 15 means any visible and identifiable characteristic, for example, the vehicle identification number, model or color of the front moving carrier 15, which is detected by the detection unit.

Subsequently, the main moving carrier 12 transmits the data request to the front moving carrier 15 according to the identification code 111 of the front moving carrier 15. When the front moving carrier 15 has the moving carrier signal transmission device 100, the front moving carrier 15 obtains the data request through the communication unit 130.

The front moving carrier 15 adds the identification code 111 of the main moving carrier 12 in the moving carrier list 151, thereby checking the position relation between the front moving carrier 15 and the main moving carrier 12. When the front moving carrier 15 does not have the moving carrier signal transmission device 100, the main moving carrier 12 directly adds the extra identification code of the front moving carrier 15 in the moving carrier list 151. The main moving carrier 12 at least adds the relative positions of the main moving carrier 12 and the front moving carrier 15, and the identification code 111 of the main moving carrier 12 in the moving carrier list 151. The main moving carrier 12 may add other possible information, for example, the record time or the speed of moving carrier, in the moving carrier list 151. The moving carrier list 151 is stored in the storage unit 150.

Figure 2C:
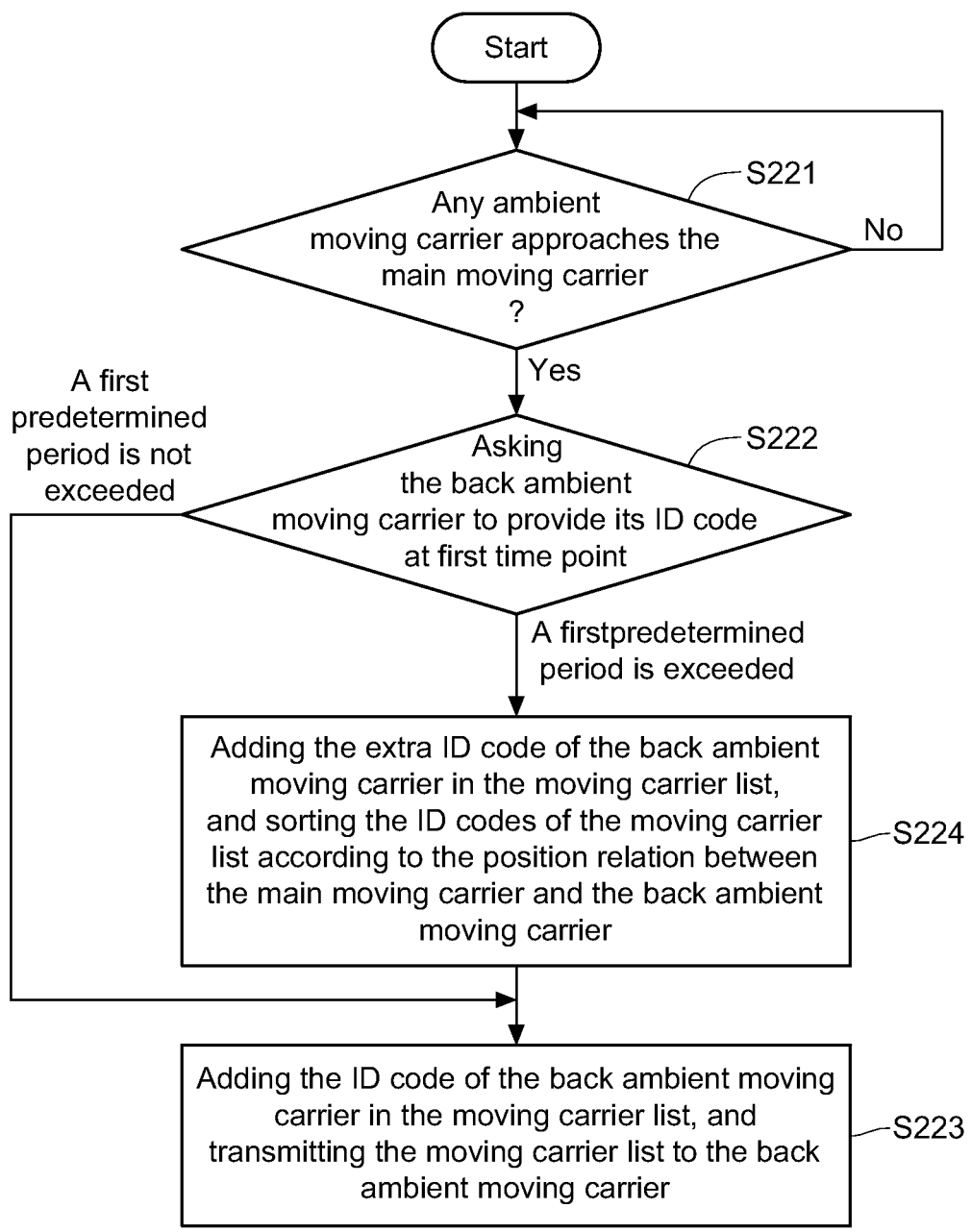
FIG. 2C is a flow chart of establishing a back moving carrier list according to the disclosure.
Figure 2D:
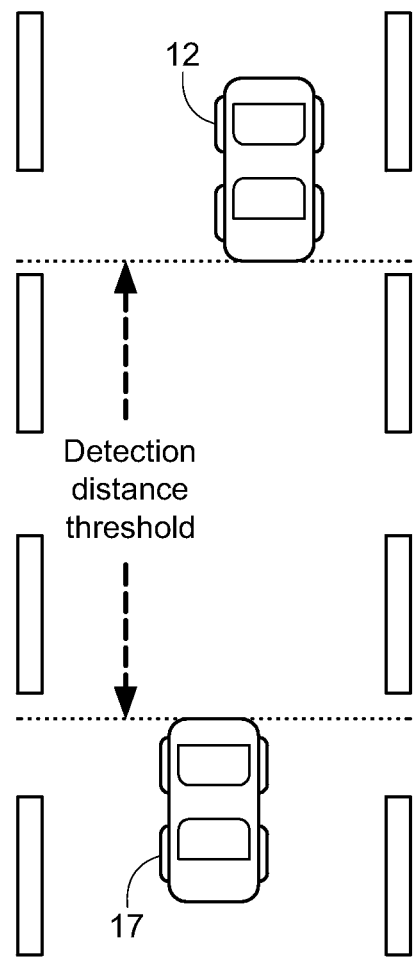
FIG. 2D is a schematic diagram of detecting a back moving carrier according to the disclosure.

Similarly, the disclosure also detects whether any ambient moving carrier 11 in back of the main moving carrier 12 approaches the main moving carrier 12 as shown in FIG. 2C. Such an ambient moving carrier 11 in back of the main moving carrier 12 is defined as a back ambient moving carrier 17 as shown in FIG. 2D.

The main moving carrier 12 detects whether any back ambient moving carrier 17 approaches the main moving carrier 12 (the step S221). When a back ambient moving carrier 17 approaches the main moving carrier 12, the main moving carrier 12 asks the back ambient moving carrier 17 to provide an identification code 111 of the back ambient moving carrier 17 in a first predetermined period (the step S222). When the back ambient moving carrier 17 provides the identification code 111 thereof in the first predetermined period, the main moving carrier 12 adds the identification code 111 of the back ambient moving carrier 17 in a moving carrier list 151 and then transmits the moving carrier list 151 to the back ambient moving carrier 17 (the step S223). When the back ambient moving carrier 17 does not respond after the first predetermined period, the main moving carrier 12 adds the extra identification code belonging to the back ambient moving carrier 17, in the moving carrier list 151 so as to sort the identification codes 111 in the moving carrier list 151 according to the positions of the back ambient moving carrier 17 and the main moving carrier 12 (the step S224), and then the process returns to the step S223. The manner to establish the moving carrier list 151 is described as follows.

When the back ambient moving carrier 17 is in the detectable threshold distance of the main moving carrier 12, the main moving carrier 12 detects the back ambient moving carrier 17. When the main moving carrier 12 obtains the response from the back ambient moving carrier 17 in the first predetermined period, the main moving carrier 12 adds the identification code 111 of the back ambient moving carrier 17 in the moving carrier list 151 and then transmits the moving carrier list 151 to the back ambient moving carrier 17.

When the main moving carrier 12 does not obtain the response of the back ambient moving carrier 17 in the first predetermined period yet, the main moving carrier 12 adds the extra identification code belonging to the back ambient moving carrier 17, in the moving carrier list 151. The main moving carrier 12 sorts the data of moving carriers in the moving carrier list 151 according to the order between the main moving carrier 12 and the back ambient moving carrier 17. Subsequently, the main moving carrier 12 transmits the moving carrier list 151 to the back ambient moving carrier 17. The detailed content of the moving carrier list 151 is described as below.

Figure 2E:
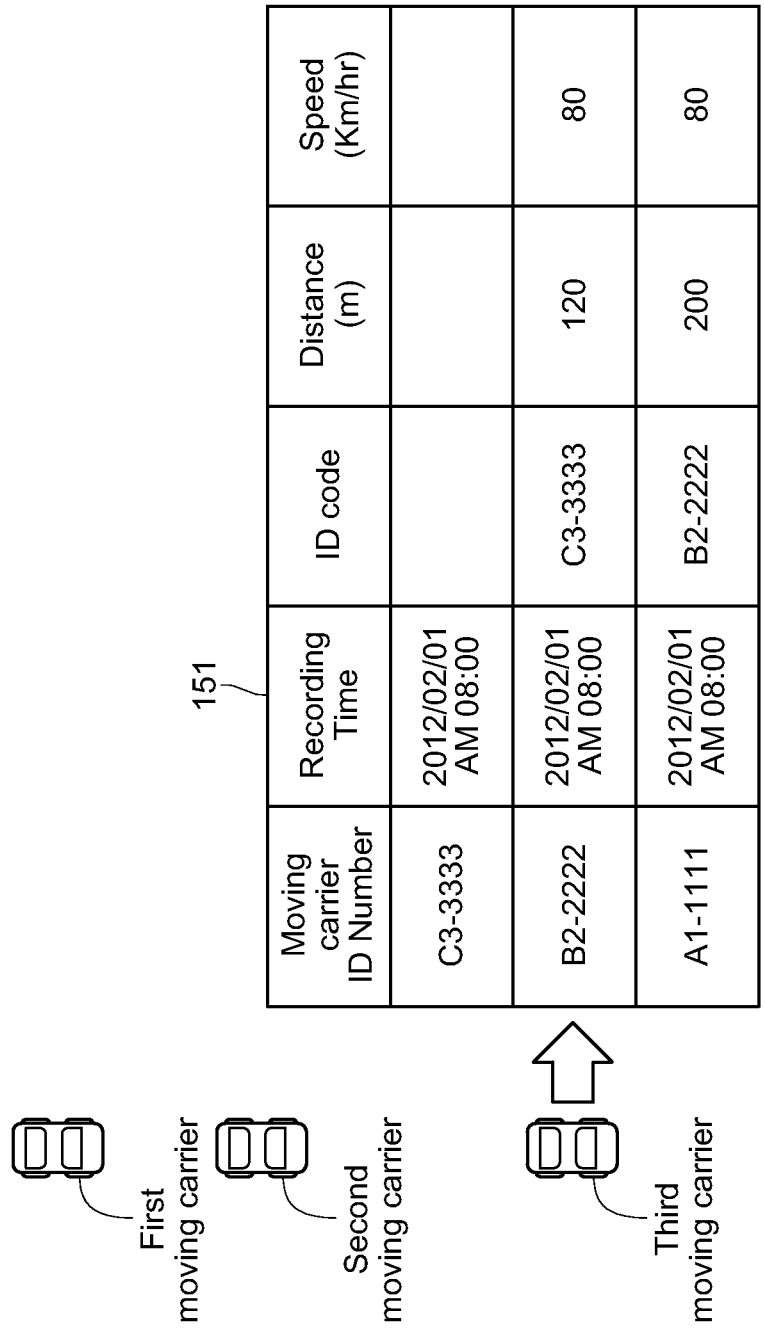
FIG. 2E is a flow chart of recording identification codes of front moving carriers according to an embodiment of the disclosure.

FIG. 2E illustrates a flow chart of recording identification codes of front moving carriers according to an embodiment of the disclosure. The content of the moving carrier list 151 is established by the main moving carrier 12 which detects the front moving carrier 15. Herein, it is an example for the illustration purpose to take a first moving carrier, a second moving carrier and a third moving carrier. The first moving carrier is in front of the second moving carrier, the second moving carrier is in front of the third moving carrier. The vehicle identification number of the first moving carrier is "C3-3333," the vehicle identification number of the second moving carrier is "B2-2222," and the vehicle identification number of the third moving carrier is "A1-1111." In one embodiment of the third moving carrier as the main moving carrier 12, the moving carrier list 151 of the third moving carrier records, in order, the identification code 111 and relevant information of the first moving carrier and of the second moving carrier.

Figure 2F:
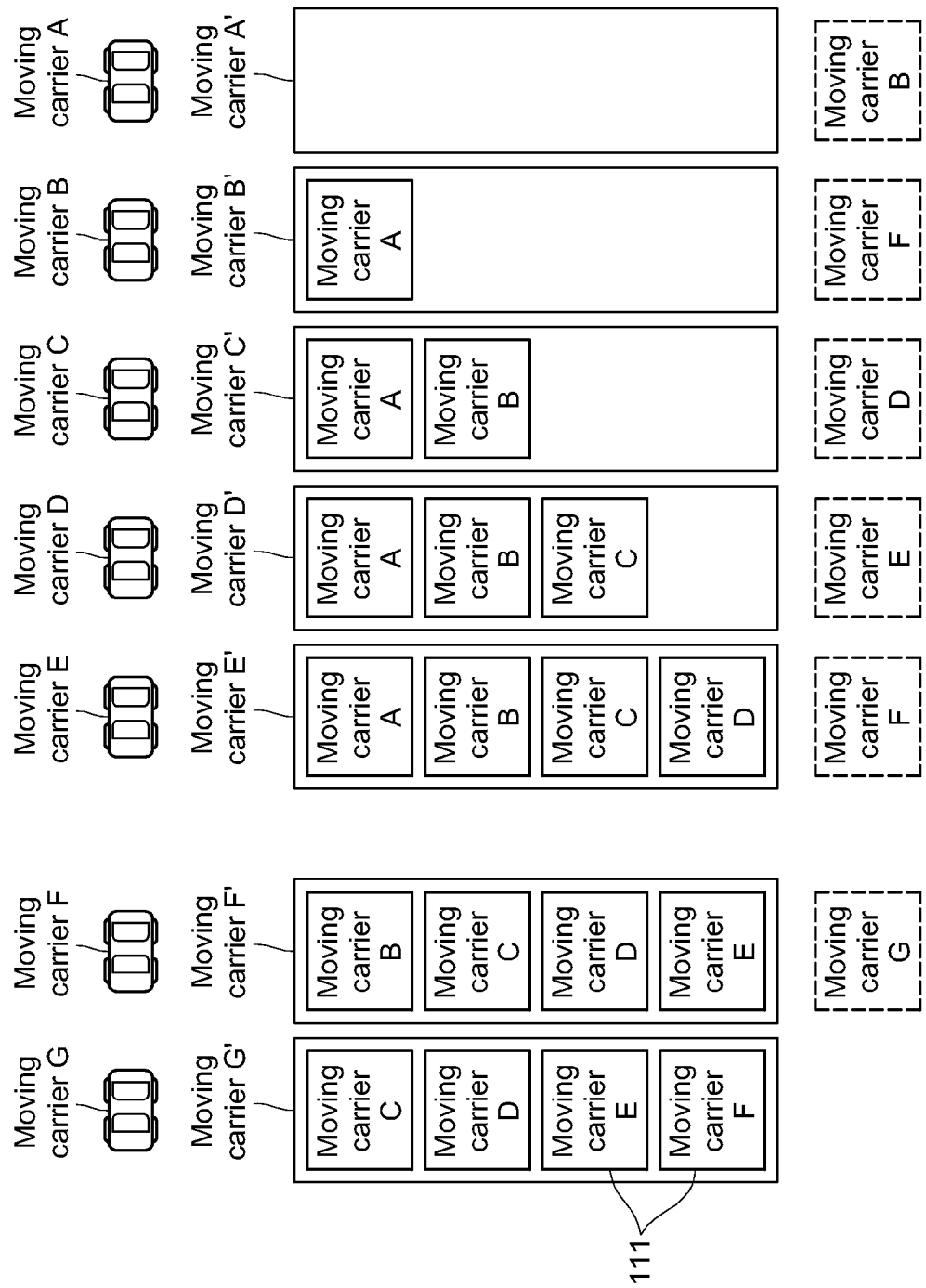
FIG. 2F is a schematic diagram of moving carrier lists of moving carriers according to an embodiment of the disclosure.

FIG. 2F illustrates a schematic diagram of moving carrier lists of moving carriers according to an embodiment of the disclosure. The contents of moving carrier lists are established by the main moving carrier which detects front moving carriers. It is an example for the illustration purpose to take seven moving carriers, namely, the moving carriers A, B, C, D, E, F and G.

The moving carrier A as the first moving carrier, there is no moving carrier in front of the moving carrier A, and the moving carrier B is in back of the moving carrier A. Thus, there is no identification code 111 of another moving carrier in the moving carrier list A' of the moving carrier A. To the moving carrier B, the front moving carrier is the moving carrier A, and the back moving carrier is the moving carrier C. Thus, the moving carrier list B' of the moving carrier B records only the identification code 111 of the moving carrier A. To the moving carrier C, the front moving carriers are, in order, the moving carrier A and the moving carrier B, and the back moving carrier is the moving carrier D. Thus, the moving carrier list C' of the moving carrier C records the information of the moving carrier A and of the moving carrier B. Similarly, to the moving carrier D, the moving carrier list D' of the moving carrier D records the information of the moving carrier A, of the moving carrier B and of the moving carrier C.

The amounts of the identification codes 111 in above moving carrier lists A', B', C' and D' are not maximum, so that a new identification code 111 is allowed to be added in one of the four moving carrier lists when a new moving carrier approaches corresponding one of the four moving carriers.

To the moving carrier E, the amount of front moving carriers thereof is equal to or greater than the upper limit of the moving carrier list E'. To the moving carrier F, the amount of front moving carriers thereof is equal to or greater than the upper limit of the moving carrier list F'. Thus, to maintain the calculation efficiency of the moving carrier list 151, the disclosure respectively removes the first one in a sequence of the identification codes 111 in the moving carrier lists E' and F'. To the moving carrier F, the front moving carriers thereof are the moving carrier A, the moving carrier B, the moving carrier C, the moving carrier D and the moving carrier E. There are five identification codes 111 in the moving carrier list F'. The moving carrier A, the moving carrier B, the moving carrier C, the moving carrier D and the moving carrier E have an identification codes 111 respectively. The moving carrier F removes the first one of the identification codes 111 in the moving carrier list E' and adds the identification code 111 thereof in the moving carrier list E' as the last one in a sequence of identification codes 111 in the moving carrier list F'. The moving carrier G is the last one in the sequence of the moving carriers A, B, C, D, E, F and G. There is no back moving carrier in back of the moving carrier G. That is why FIG. 2F does not present any back moving carrier to the moving carrier G. In this way, the disclosure can accurately check whether any moving carrier exists in front of the main moving carrier 12.

Otherwise, if the main moving carrier 12 has the moving carrier signal transmission device 100 or if a transmission error is happened to the front moving carrier 15, the main moving carrier 12 may not obtain the moving carrier list 151 of the front moving carrier 15. Thus, when the front moving carrier 15 does not respond to the main moving carrier 12, the disclosure rather utilizes time information to determine whether the moving carrier list 151 is updated in real time, so as to ensure the moving carrier list 151 is new.

To ensure the content of the moving carrier list 151 is correct, the main moving carrier 12 records the information of the front moving carrier 15 in the moving carrier list 151 after transmitting a data request and waiting for a first predetermined period. For this purpose, the main moving carrier 12 acquires the vehicle identification number of the front moving carrier 15 through the image identification manner and evaluates the distance between the front moving carrier 15 and the main moving carrier 12 via the detection unit 120. After obtaining the vehicle identification number of the front moving carrier 15 or obtaining the distance between the main moving carrier 12 and the front moving carrier 15, the main moving carrier 12 adds such information in the moving carrier list 151.

Figure 3:
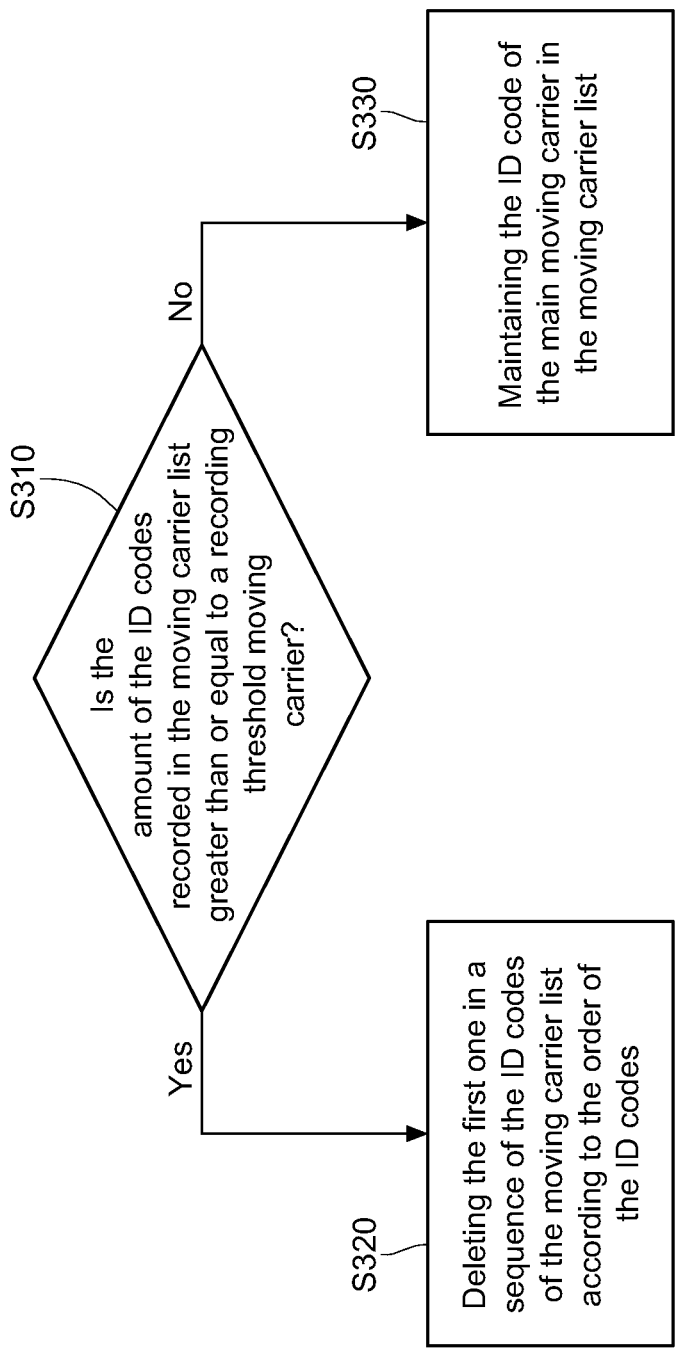
FIG. 3 is a flow chart of controlling the amount of the identification codes in the moving carrier list of the disclosure.

To avoid low transmission efficiency caused by the too much content of the moving carrier list 151, the amount of data corresponding to moving carriers and recorded in the moving carrier list 151 is adjusted according to the following steps shown in FIG. 3. Firstly, the main moving carrier 12 determines whether the amount of the identification codes 111 recorded in the moving carrier list 151 is greater than a recording threshold value (the step S310). When the amount of the identification codes 111 is grater than or equal to the recording threshold value, the main moving carrier 12 deletes the first one in a sequence of the identification codes 111 in the moving carrier list 151 according to the order of the identification codes 111 (the step S320). Therefore, the main moving carrier 12 is available to add a new identification code 111 in the moving carrier list 151 after deleting the first identification code 111, and then to store the updated moving carrier list 151. When the amount of the identification codes is smaller than the recording threshold value, the main moving carrier 12 maintains the first one in the sequence of the identification codes 111 in the moving carrier list 151 (the step S330). Therefore, the main moving carrier 12 is available add a new identification code 111 in the moving carrier list 151 directly and then to store the updated moving carrier list 151. The detailed operation is described as below.

After the main moving carrier 12 obtains the moving carrier list 151, the processing unit 140 counts the amount of the identification codes 111 in the moving carrier list 151. The processing unit 140 further determines whether the amount of the identification codes 111 is greater than or equal to the recording threshold value. When the amount of the identification codes 111 is smaller than the recording threshold value, the processing unit 140 directly stores the identification code 111 of the main moving carrier 12 in the moving carrier list 151. When the amount of the identification codes 111 in the moving carrier list 151 is greater than or equal to the recording threshold value, the processing unit 140 can delete the first one of or several top ones of in a sequence of the identification codes 111 in the moving carrier list 151. The identification codes 111 in the moving carrier list 151 are sorted according to the order of the positions where moving carriers on the paths respectively are. For example, the first identification code 111 indicates the farthest moving carrier is apart from the main moving carrier 12.

For example, the moving carrier list 151 has ten identification codes 111. To add the identification code 111 of the main moving carrier 12 in the moving carrier list 151, the processing unit 140 deletes the first identification code 111 and then add the identification code 111 of the main moving carrier 12 in the moving carrier list 151 as the last one in the sequence of the identification codes 111 in the moving carrier list 151. Additionally, the disclosure can preset the amount of the identification codes 111 to be deleted.

To ensure the moving carrier list 151 being effective, the disclosure regularly updates the moving carrier list 151. After obtaining the moving carrier list 151 and then waiting for a second predetermined period, the main moving carrier 12 anew detects whether any front moving carrier 15 exists, thereby updating the moving carrier list 151 regularly. Furthermore, the updated moving carrier list 151 is transmitted to other ambient moving carriers.

Similarly, when the front moving carrier 15 updates the moving carrier list 151, the front moving carrier 15 can actively or regularly transmit the updated moving carrier list 151 to the main moving carrier 12 approaching the front moving carrier 15.

Beside the disclosure records every moving carrier on a common path, the disclosure is also available to record moving carriers on different paths, for example, the moving carriers on two adjacent paths. Through the above manner, the main moving carrier 12 can detect whether any front moving carrier 15, which is on the path adjacent to the path where the main moving carrier 12 is, exists, and acquires the identification code 111 of the front moving carrier 15. Moreover, the main moving carrier 12 also can record the position of the main moving carrier 12 and the position of at least one moving carrier on the adjacent path, in the moving carrier list 151. Similarly, the disclosure is available to detect whether any back ambient moving carrier 17 exists, through the same manner.

When the moving carrier list 151 is established, the moving carrier can determine the relations among itself and other moving carriers on the same path according to the content of the moving carrier list 151 and the order within the content.

Figure 4A:
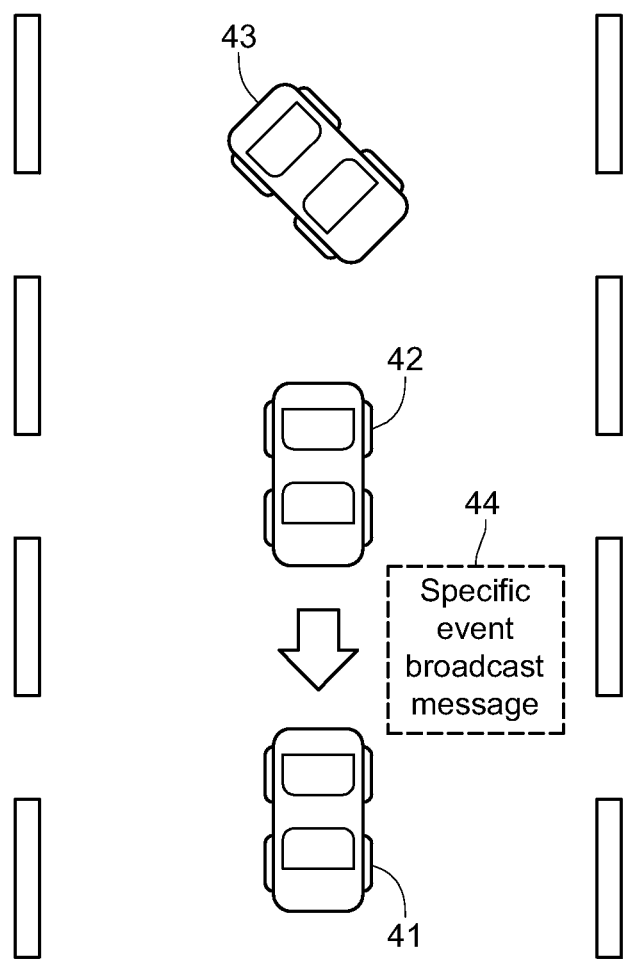
FIG. 4A is a schematic diagram of a target moving carrier and other moving carriers in the disclosure.
Figure 4B:
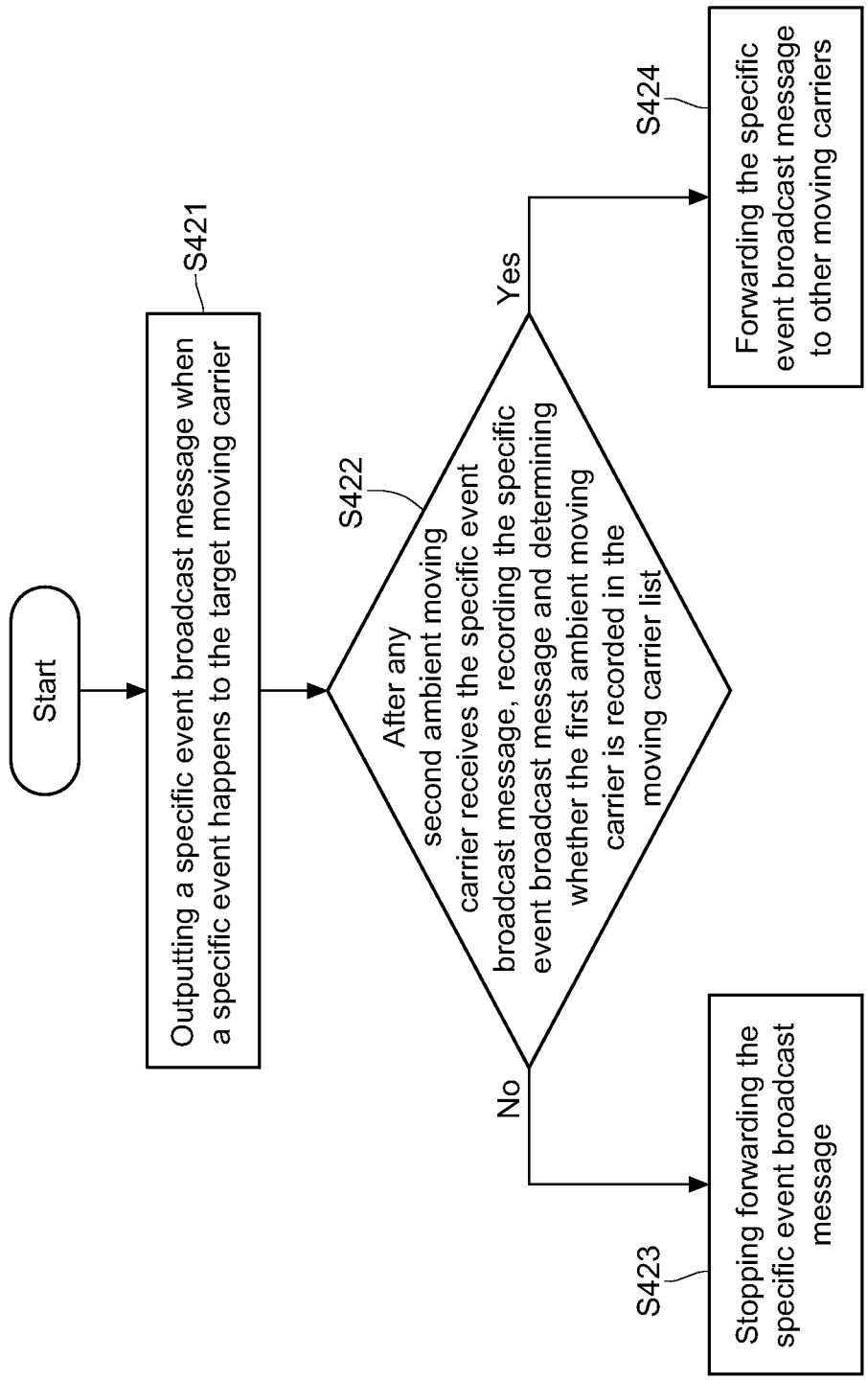
FIG. 4B is a flow chart of outputting a specific event broadcast message when an ambient moving carrier detects that a specific event happens to a target moving carrier , according to the disclosure.

FIG. 4A illustrates a schematic diagram of a target moving carrier and other moving carriers in the disclosure. To distinguish the this embodiment from the above embodiments, the above main moving carrier 12 which a specific event, for example, a car accident, an emergency brake and so on, happens to is defined as a target moving carrier 43. There are a plurality of back moving carriers in back of the target moving carrier 43. The back moving carrier, which sends out a specific event broadcast message 44, is defined as a first ambient moving carrier 42. The back moving carrier, which receives the specific event broadcast message 44, is defined as a second ambient moving carrier 41. The content of the specific event broadcast message 44 is an identification code 111 which is used to notify other moving carriers of the moving carrier which has the specific event, according to the identification codes 111 in the moving carrier list 151. The specific event detection method for a moving carrier is described in FIG. 4B.

When a specific event happens to the target moving carrier 43, the first ambient moving carrier 42 sends out a specific event broadcast message 44 (the step S421). When the second ambient moving carrier 41 receives the specific event broadcast message 44, the second ambient moving carrier 41 records the specific event broadcast message 44 and determines whether the first ambient moving carrier 42 is recorded in the moving carrier list 151 of the second ambient moving carrier 41 (the step S422). When the first ambient moving carrier 42 is not recorded in the moving carrier list 151 of the second ambient moving carrier 41, the second ambient moving carrier 41 stops forwarding the specific event broadcast message 44 to other moving carriers (the step S423). When the first ambient moving carrier 42 is recorded in the moving carrier list 151 of the second ambient moving carrier 41, the second ambient moving carrier forwards the specific event broadcast message 44 to other moving carriers (the step S424). The detailed operation among the moving carriers is described as follows.

Generally, it is easy for a back moving carrier in back of the target moving carrier 43 to first discover a traffic event. When a specific event happens to the target moving carrier 43, at least one first ambient moving carrier 42 in back of the target moving carrier 43 send s out a specific event broadcast message 44. The first ambient moving carrier 42 utilizes an image detection manner or an acceleration variation detection manner to detect whether any movement error happens to the front moving carrier (the target moving carrier 43). In some embodiments, the first ambient moving carrier 42 utilizes the image identification manner to detect whether the target moving carrier 43 slows down fast or rolls over. In some embodiments, the first ambient moving carrier 42 detects whether the acceleration of the target moving carrier 43 is increased or reduced, thereby determining whether the target moving carrier 43 slows down or brakes.

When the second ambient moving carrier 41 receives the specific event broadcast message 44, the second ambient moving carrier 41 records the specific event broadcast message 44 and determines whether the first ambient moving carrier 42 is recorded in the moving carrier list 151. The first ambient moving carrier 42 transmits the specific event broadcast message 44 to other moving carriers (the second ambient moving carrier 41) via the communication unit 130. When receiving the specific event broadcast message 44, the second ambient moving carrier 41 determines whether the target moving carrier 43 is recorded in the moving carrier list 151, by identifying the identification codes 111 according to the specific event broadcast message 44 and the moving carrier list 151 in the second ambient moving carrier 41.

When the first ambient moving carrier 42 is not recorded in the moving carrier list 151 of the second ambient moving carrier 41, the second ambient moving carrier 41 stops forwarding the specific event broadcast message 44. This can avoid that other moving carriers forward the specific event broadcast message 44 repeatedly. When the first ambient moving carrier 42 is recorded in the moving carrier list 151 of the second ambient moving carrier 41, the second ambient moving carrier 41 forwards the specific event broadcast message 44 to other moving carriers. Herein, these other moving carriers respectively set the second ambient moving carrier 41, which forwards the current specific event broadcast message 44, as a first ambient moving carrier 42 thereof. Simultaneously, the processing unit 140 drives corresponding elements in the second ambient moving carrier 41 to notify a user, for example, a driver, that an emergency event occurs in front of the second ambient moving carrier 41.

To avoid that the specific event broadcast message 44 is forwarded infinite times, the disclosure further adds a limitative condition, such as a number of transmission times, a forwarding distance or a transmission period, in the specific event broadcast message 44. When the limitative condition is exceeded, the specific event broadcast message 44 is not continuously forwarded from one moving carrier to another one.

Figure 4C:
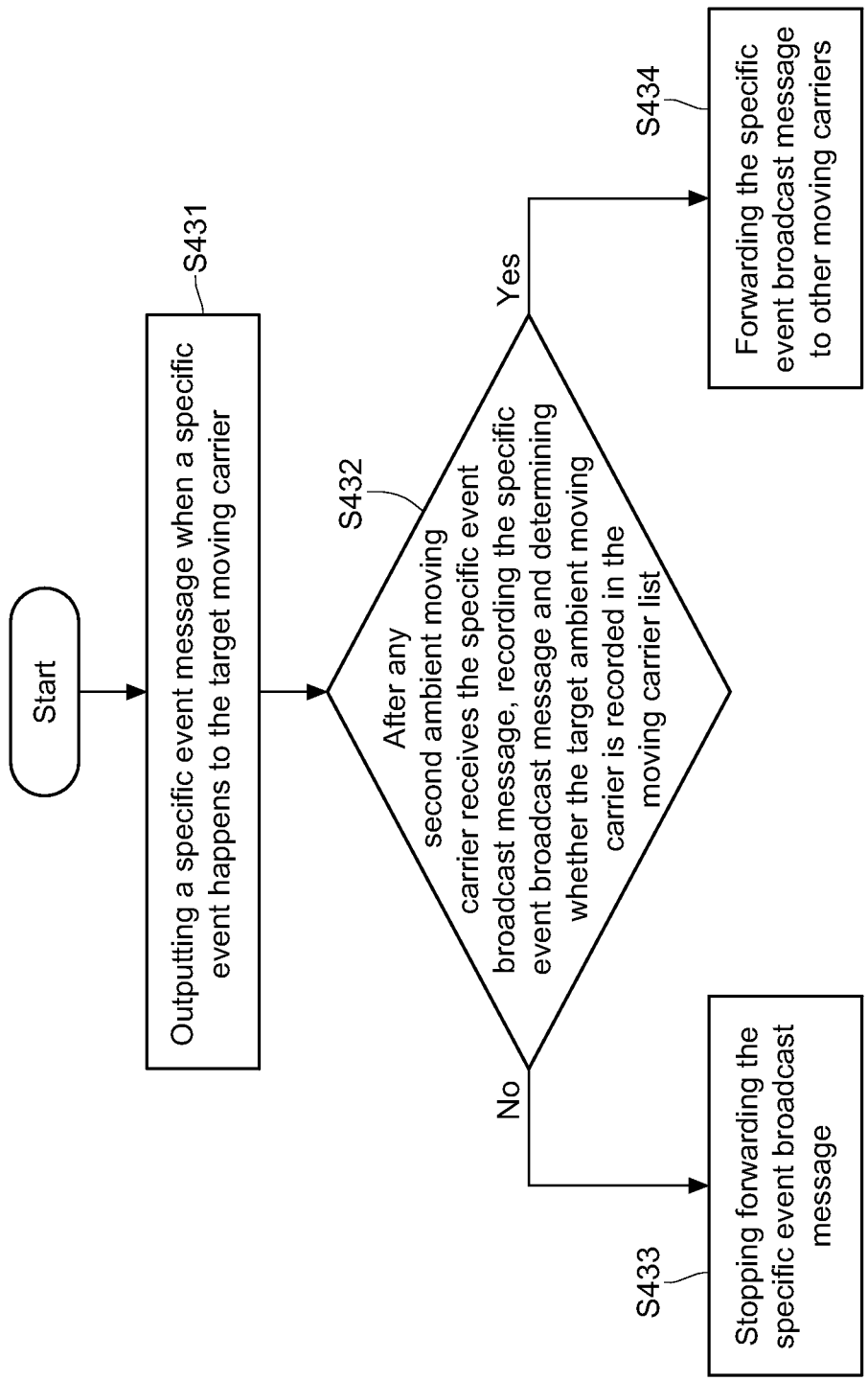
FIG. 4C is a flow chart of outputting a specific event broadcast message to an ambient moving carrier when a target moving carrier has a specific event, according to the disclosure.

In this embodiment, when a specific event occurs, the target moving carrier 43 is also available to output a specific event broadcast message 44 as shown in FIG. 4C. When a specific event happens to the target moving carrier 43, the target moving carrier 43 sends out a specific event broadcast message 44 (the step S431). When any second ambient moving carrier 41 receives the specific event broadcast message 44, the second ambient moving carrier 41 records the specific event broadcast message 44 and determines whether the target moving carrier is recorded in the moving carrier list 151 (the step S432). When the target moving carrier 43 is not recorded in the moving carrier list 151 of the second ambient moving carrier 41, the second ambient moving carrier 41 stops transmitting the specific event broadcast message 44 (the step S433). When the target moving carrier 43 is recorded in the moving carrier list 151 of the second ambient moving carrier 41, the second ambient moving carrier 41 forwards the specific event broadcast message 44 to other moving carriers (the step S434).

Moreover, the disclosure further determines whether the number of transmission times in the specific event broadcast message 44 is greater than or equal to a transmission threshold value (the step S432). When the number of transmission times is smaller than the transmission threshold value, the second ambient moving carrier 41 accumulates the number of transmission times and then forwards the specific event broadcast message 44. When the number of transmission times is greater than or equal to the transmission threshold value, the second ambient moving carrier 41 stops forwarding the specific event broadcast message 44.

The disclosure is available to dispose the moving carrier signal transmission device in a car and to connect the moving carrier signal transmission device with other elements in the car.

Figure 5:
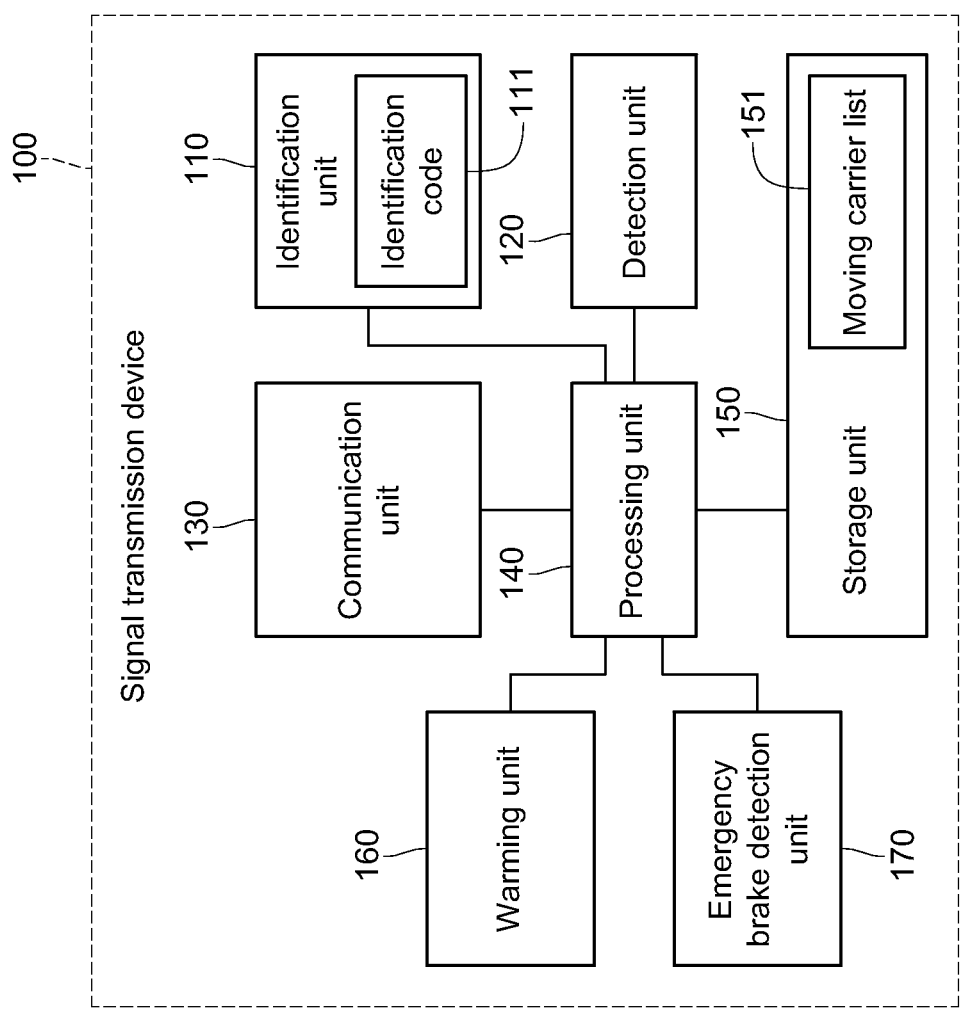
FIG. 5 is a structural diagram of the moving carrier signal transmission device according to an embodiment of the disclosure.

FIG. 5 illustrates a structural diagram of the moving carrier signal transmission device according to an embodiment of the disclosure. The moving carrier signal transmission device 100 includes an identification unit 110, a detection unit 120, a communication unit 130, a processing unit 140, a storage unit 150, a warming unit 160 and an emergency brake detection unit 170. The processing unit 140 electronically connects to the identification unit 110, the detection unit 120, the communication unit 130, the storage unit 150, the warming unit 160 and the emergency brake detection unit 170.

The identification unit 110 stores an identification code 111 of the moving carrier signal transmission device 100. Every moving carrier including the moving carrier signal transmission device 100 has a corresponding identification code 111. The detection unit 120 detects whether any ambient moving carrier 11 in front of the main moving carrier 12 is in a detectable threshold distance. When an ambient moving carrier 11 is in the detectable threshold distance, the processing unit 140 drives the communication unit 130 to communicate with the ambient moving carrier 11 and then to acquire the identification code 111 of the ambient moving carrier 11.

When obtaining a specific event broadcast message 44, the processing unit 140 drives the warming unit 160 to notify the user that a specific event occurs in front of the main moving carrier 12. The warming unit 160 can be, for example, a speaker, a monitor or a light-emitting diode (LED). For example, when the ambient moving carrier 11 receives the specific event broadcast message 44, the processing unit 140 controls the warming frequency or volume of the speaker according to the distance between the main moving carrier 12 and the ambient moving carrier 11.

The emergency brake detection unit 170 detects whether the moving carrier is slowing down fast or is braking. The emergency brake detection method is performed by measuring the braking force, or by detecting the acceleration variation of the moving carrier via a gyroscope. When the emergency brake detection unit 170 discovers that the moving carrier is slowing down fast, the processing unit 140 drives the communication unit 130 to send out the specific event broadcast message 44. Thus, other moving carriers may know that the front moving carrier slows down fast or brakes fast, thereby notifying more moving carriers or passengers that a specific event occurs.

FIG. 6 illustrates a structural diagram of the moving carrier signal transmission device according to an embodiment of the disclosure. The moving carrier signal transmission device 600 includes an identification unit 610, a detection and communication unit 620, a storage unit 640 and a processing unit 630. The processing unit 630 electronically connects to the identification unit 610, the detection and communication unit 620 and the storage unit 640. The identification unit 610 stores an identification code 611. The detection and communication unit 620 detects whether any ambient moving carrier 11 is in the detectable threshold distance of the main moving carrier 12. The detection and communication unit 620 also transmits a data request or a moving carrier list to the ambient moving carrier 11. The storage unit 640 stores the moving carrier list 641.

The detection and communication unit 620 acquires the identification code 611 of the moving carrier via the radar technique, the wireless network technique, the WAVE/DSRC technique, the FSO technique, the Bluetooth technique, the RFID technique, the ultra wideband technique, the laser sensing technique, the infrared sensing technique or so on. The detection and communication unit 620 can transmit the identification code 611 via the above manners.

In this embodiment, when the distance between the ambient moving carrier 11 and the main moving carrier 12 is smaller than the detectable threshold distance, the main moving carrier 12 outputs the data request to the ambient moving carrier 11. When the ambient moving carrier 11 also has the moving carrier signal transmission device 600, the ambient moving carrier 11 also provides the identification code 611 thereof to the main moving carrier 12 via the detection and communication unit 620. The transmission manner for the moving carrier list 641 is performed according to the operation in FIGS. 2A, 2C, 3, 4B and 4C.

Through the moving carrier list establishment method, the specific event detection method and the moving carrier signal transmission device provided by the disclosure, the specific event broadcast message is transmitted among a plurality of moving carriers. When a specific event happens to a front moving carrier, a back moving carrier in back of the front moving carrier transmits a notice corresponding to the specific event to another back moving carrier in back of the back moving carrier. In this way, the moving carriers in bake of the front moving carrier may know a specific event occurs in the front.

The disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and region of equivalency of the claims are to be embraced within their scope.

What is claimed is:

1. A moving carrier signal transmission method, adapted to detect and record a relative position of a main moving carrier and of at least one ambient moving carrier, comprising:
   by the main moving carrier, detecting whether the at least one ambient moving carrier exists;
   by the main moving carrier, acquiring an identification code of the at least one ambient moving carrier when the at least one ambient moving carrier exists;
   by the main moving carrier, adding an identification code of the main moving carrier and the identification code of the at least one ambient moving carrier in a data request and then transmitting the data request to the at least one ambient moving carrier;
   by the at least one ambient moving carrier, adding the identification code of the main moving carrier into a moving carrier list when the at least one ambient moving carrier obtains the data request, and then transmitting the moving carrier list to the main moving carrier; and
   sorting the identification codes in the moving carrier list according to the position of the at least one ambient moving carrier and of the main moving carrier.

2. The moving carrier signal transmission method according to claim 1, wherein the step of detecting whether the at least one ambient moving carrier exists comprises:
   determining whether the at least one ambient moving carrier is in front of, in back of, in the left side of, or in the right side of the main moving carrier.

3. The moving carrier signal transmission method according to claim 2, wherein when a distance between the at least one ambient moving carrier and the main moving carrier is smaller than or equal to a detectable threshold distance, the main moving carrier acquires the identification code of the at least one ambient moving carrier from the at least one ambient moving carrier.

4. The moving carrier signal transmission method according to claim 1, wherein the step of transmitting the moving carrier list to the main moving carrier comprises:
   by the main moving carrier, determining whether an amount of the identification codes in the moving carrier list is greater than a recording threshold value; and
   by the main moving carrier, deleting at least one of the identification codes in the moving carrier list according to the order of the identification codes in the moving carrier list when the amount of the identification codes is greater than the recording threshold value.

5. The moving carrier signal transmission method according to claim 1, wherein after the step of transmitting the data request to the at least one ambient moving carrier, the signal transmission method further comprises:
   by the main moving carrier, recording an extra identification code of the ambient moving carrier in the moving carrier list when the main moving carrier does not obtain the identification code of the ambient moving carrier in a first predetermined period.

6. The moving carrier signal transmission method according to claim 1, wherein after a second predetermined period or when data in the moving carrier list is changed, the main moving carrier detects the ambient moving carrier again and updates the moving carrier list.

7. The moving carrier signal transmission method according to claim 1, wherein the step of sorting the moving carrier list comprises:
   when a specific event happens to the main moving carrier, sending out a specific event broadcast message from at least one first ambient moving carrier;
   when a second ambient moving carrier obtains the specific event broadcast message, recording the specific event broadcast message and determining whether the first ambient moving carrier is recorded in the moving carrier list of the second ambient moving carrier;
   when the first ambient moving carrier is not recorded in the moving carrier list of the second ambient moving carrier, stopping forwarding the specific event broadcast message from the second ambient moving carrier; and
   when the first ambient moving carrier is recorded in the moving carrier list of the second ambient moving carrier, forwarding the specific event broadcast message from the second ambient moving carrier.

8. The moving carrier signal transmission method according to claim 7, wherein the step of obtaining the specific event broadcast message by the second ambient moving carrier comprises:
   determining whether a number of transmission times in the specific event broadcast message is greater than a transmission threshold value;
   when the number of transmission times is smaller than the transmission threshold value, by the second ambient moving carrier, accumulating the number of transmission times and forwarding the specific event broadcast message; and when the number of transmission times is greater than or equal to the transmission threshold value, by the second ambient moving carrier, stopping forwarding the specific event broadcast message.

9. The moving carrier signal transmission method according to claim 1, wherein after the step of sorting the moving carrier list, the moving carrier signal transmission method further comprises:
when a specific event happens to the main moving carrier, sending out a specific event broadcast message from the main moving carrier;
when a second ambient moving carrier obtains the specific event broadcast message, recording the specific event broadcast message, and determining whether the main moving carrier is recorded in the moving carrier list of the second ambient moving carrier;
when the main moving carrier is not recorded in the moving carrier list of the second ambient moving carrier, stopping forwarding the specific event broadcast message from the second ambient moving carrier; and
when the main moving carrier is recorded in the moving carrier list of the second ambient moving carrier, forwarding the specific event broadcast message from the second ambient moving carrier.

10. The moving carrier signal transmission method according to claim 9, wherein the step of obtaining the specific event broadcast message by the second ambient moving carrier comprises:
by the second ambient moving carrier, determining whether a number of transmission times in the specific event broadcast message is greater than a transmission threshold value;
when the number of transmission times is smaller than the transmission threshold value, by the second ambient moving carrier, accumulating the number of transmission times and forwarding the specific event broadcast message; and
when the number of transmission times is greater than or equal to the transmission threshold value, by the second ambient moving carrier, stopping forwarding the specific event broadcast message.

11. A moving carrier signal transmission device, for establishing a moving carrier list transmitted between a main moving carrier and an ambient moving carrier, and comprising:
an identification unit, for storing an identification code of the main moving carrier;
a detection unit, for detecting whether the ambient moving carrier is in a detectable threshold distance of the main moving carrier;
a communication unit, for transmitting a data request or the moving carrier list;
a storage unit, for storing the moving carrier list; and
a processing unit, electronically connected to the identification unit, the communication unit and the storage unit;
wherein, when the ambient moving carrier in the detectable threshold distance, the processing unit actuates the communication unit to acquire the identification code from the ambient moving carrier, the processing unit adds the identification codes of the main moving carrier and the ambient moving carrier in the data request and then actuates the communication unit to transmit the data request to the ambient moving carrier according to the identification code of the ambient moving carrier, and the ambient moving carrier adds the identification code of the main moving carrier in the moving carrier list and then transmits the moving carrier list to the main moving carrier.

12. The moving carrier signal transmission device according to claim 11, wherein when the processing unit does not obtain the moving carrier list outputted by the ambient moving carrier, during a first predetermined period, the processing unit records the ambient moving carrier in the moving carrier list.

13. The moving carrier signal transmission device according to claim 11, wherein the detection unit acquires an extra identification code of the ambient moving carrier, which serves as the identification code of the ambient moving carrier, when the communication unit does not acquire the identification code of the ambient moving carrier.

14. A moving carrier signal transmission device, for establishing a moving carrier list transmitted between a main moving carrier and an ambient moving carrier, and comprising:
an identification unit, for storing an identification code;
a detection and communication unit, for detecting whether the ambient moving carrier is in a detectable threshold distance of the main moving carrier, so as to transmit a data request or the moving carrier list to the ambient moving carrier;
a storage unit, for storing the moving carrier list; and
a processing unit, electronically connecting to the identification unit, the detection and communication unit and the storage unit;
wherein, when the ambient moving carrier is in the detectable threshold distance, the processing unit actuates the detection and communication unit to acquire the identification code of the ambient moving carrier from the ambient moving carrier, the processing unit adds the identification codes of the main moving carrier and the ambient moving carrier in the data request, and then actuates the detection and communication unit to transmit the data request to the ambient moving carrier according to the identification code of the ambient moving carrier, and the ambient moving carrier adds the identification code of the main moving carrier in the moving carrier list and then transmits the moving carrier list to the main moving carrier.

15. The moving carrier signal transmission device according to claim 14, wherein the detection and communication unit acquires an extra identification code of the ambient moving carrier, which serves as the identification code of the ambient moving carrier, when the detection and communication unit does not acquire the identification code of the ambient moving carrier.

* * * * *